United States Patent [19]

Lee

[11] Patent Number: 5,716,160
[45] Date of Patent: Feb. 10, 1998

[54] MOUNTING DEVICE FOR CUSHION PLUNGER IN HYDRAULIC CYLINDER

[75] Inventor: Jae Hoon Lee, Changwon, Rep. of Korea

[73] Assignee: Samsung Heavy Industries, Seoul, Rep. of Korea

[21] Appl. No.: 783,715

[22] Filed: Jan. 16, 1997

Related U.S. Application Data

[63] Continuation of Ser. No. 505,500, Jul. 21, 1995, abandoned.

[30] Foreign Application Priority Data

Feb. 28, 1995 [KR] Rep. of Korea .................. 95-3376 U

[51] Int. Cl.$^6$ .................................................. B25G 3/02
[52] U.S. Cl. ........................ 403/365; 403/327; 403/371; 403/DIG. 7; 91/405
[58] Field of Search ............................. 403/326, 327, 403/DIG. 7, 365, 371; 91/405, 408, 409; 187/9 E, 9 R; 92/85

[56] References Cited

U.S. PATENT DOCUMENTS

| | | | |
|---|---|---|---|
| 3,034,482 | 5/1962 | Rader | 91/405 |
| 3,189,962 | 6/1965 | Hartwell | 403/371 X |
| 3,267,815 | 8/1966 | Ortman et al. | 91/408 |
| 3,322,039 | 5/1967 | Madland | 91/405 |
| 3,323,422 | 6/1967 | Freese | 91/409 |
| 3,592,106 | 7/1971 | Baughman | 91/409 X |
| 3,708,188 | 1/1973 | Flick | 287/20 P |
| 4,706,781 | 11/1987 | Ikimi et al. | 91/405 X |
| 5,082,390 | 1/1992 | Balselles | 403/326 |
| 5,307,729 | 5/1994 | Hedlund | 91/409 X |
| 5,308,183 | 5/1994 | Stegeman et al. | 403/371 X |
| 5,545,842 | 8/1996 | Balsells | 403/337 X |

FOREIGN PATENT DOCUMENTS 12971 of 1914 United Kingdom ............ 403/DIG. 7

*Primary Examiner*—Kenneth J. Dorner
*Assistant Examiner*—Bruce A. Lev
*Attorney, Agent, or Firm*—Kenyon & Kenyon

[57] ABSTRACT

A device for mounting a cushion plunger to one end of the piston rod in a hydraulic cylinder, the cushion plunger constituting a part of a cushion mechanism installed to dampen the impact generated during the rotation of the piston in the hydraulic cylinder. The mounting device includes a recess provided at the end of the piston rod and adapted to partially receive the cushion plunger, a pin hole provided at the piston rod, the pin hole extending in a direction orthogonal to the recess such that it communicates with the recess, another pin hole perforated throughout the cushion plunger radially of the cushion plunger, the pin holes being aligned with each other at a state that the cushion plunger is received in position in the recess, a fling pin inserted into the pin holes being aligned with each other, the fling pin being adapted to fix the cushion plunger to the piston rod, and a clearance defined between the outer diameter of the fixing pin and the inner diameter of the pin hole of the cushion plunger.

2 Claims, 4 Drawing Sheets

MOUNTING DEVICE FOR CUSHION PLUNGER IN HYDRAULIC CYLINDER

This application is a continuation of application Ser. No. 08/505,500, filed on Jul. 21, 1995 now abandoned.

BACKGROUND OF THE INVENTION

1. Field of the Invention

The present invention relates to a mounting device for a cushion plunger in a hydraulic cylinder, and more particularly to a mounting device for a cushion plunger of a cushion mechanism installed to dampen the impact generated during rotation of the piston in the hydraulic cylinder, the cushion plunger being mounted at the end of the piston rod which is coupled to the piston.

2. Description of the Prior Art

In a hydraulic cylinder, the piston strikes the inner wall of the cylinder at the dead point of its stroke, thereby generating shock. Such shock creates problems such as damage of various elements constituting the hydraulic cylinder and vibration.

In order to solve such problems, there have been proposed a variety of cushion mechanisms, such as cushion protrusion and cushion plunger, installed in the hydraulic cylinder.

Of such cushion mechanisms, one includes an oil passage formed in one portion of the inner wall of a hydraulic cylinder, which corresponds to the dead point of the stroke of the piston, a cushion valve adapted to open and close the oil passage and constituted by a ball check, and a cushion plunger mounted to the end of the piston. In this cushion mechanism, as the cushion plunger penetrates the oil passage at the dead point of the piston stroke, the oil in the oil passage is outwardly discharged from the oil passage while pushing the ball check, thereby achieving a cushion action.

Meanwhile, the cushion plunger should be periodically replaced by a new one in order to maintain optimum performance of the hydraulic cylinder. Because it is the element that is subjected to a repeated impact generated upon the repeated striking of the rotating piston against the inner wall of the cylinder it may be easily damaged.

Referring to FIGS. 1(A) and 1(B), there is illustrated a conventional construction for mounting a cushion plunger to the piston in a hydraulic cylinder. As shown in FIG. 1, a piston rod 101 is provided at its inner end with a receiving recess 102. In the receiving recess 102, one end of a cushion plunger 103 is received.

In order to fix the cushion plunger 103 at a state that the cushion plunger 103 is received in the receiving recess 102 and separate the cushion plunger 103 from the receiving recess 102 if desired, an annular groove 104 having a hemispheric cross-section is formed along the inner peripheral surface of the receiving recess 102. At a position corresponding to the annular groove 104, an annular groove 105 having a hemispheric cross-section is also formed along the outer peripheral surface of the plunger 103. Between the annular grooves 104 and 105, steel balls 106 are interposed between the annular grooves 104 and 105 to support the plunger 103.

However, such a conventional cushion plunger mounting construction has problems of low durability and the high possibility of damage because the steel balls bear most of the impact generated when the cushion plunger strikes against the inner wall of the cylinder.

Moreover, it is considerably difficult to machine the annular grooves along the inner peripheral surface of the piston rod and the outer peripheral surface of cushion plunger. In particular, where the diameter of the annular grooves does not coincide with the diameter of the steel balls, the cushion plunger or the steel balls may be damaged more easily. For this reason, its construction requires considerable machining accuracy.

SUMMARY OF THE INVENTION

Therefore, the present invention has been made in view of the problems encountered in the prior art and an object of the invention is to provide a mounting device for a cushion plunger in a hydraulic cylinder, capable of achieving improved durability, reduction in the number of constituting elements, and a great reduction in the number of manufacturing and assembling steps.

In accordance with one aspect, the present invention provides a device for mounting a cushion plunger to an end of the piston rod in a hydraulic cylinder, the cushion plunger constituting a part of the cushion mechanism installed to dampen the impact generated during the rotation of the piston in the hydraulic cylinder, comprising a recess provided at one end of the piston rod; a pair of annular grooves respectively formed along an inner peripheral surface of the recess and an outer peripheral surface of the cushion plunger; and a fixing ring received in the grooves.

In accordance with the preferred feature of the present invention, the fixing ring has a cross-section having an elongated shape having rounded radially inner and outer sides, the grooves have cross-sections respectively identical to those of the radially outer and radially inner portions of the fixing ring, the groove formed along the outer peripheral surface of the cushion plunger to support the radially inner portion of the fixing ring has a specific width to provide a predetermined clearance between the groove and the fixing ring, and the recess has an inner end being in contact with the end of the cushion plunger facing the inner end.

In accordance with another feature of the present invention, the fixing ring comprises two ring halves divided from a complete ring along the center line of the ring.

In accordance with another aspect, the present invention provides a device for mounting a cushion plunger to one end of a piston rod in a hydraulic cylinder, the cushion plunger constituting a part of a cushion mechanism installed to dampen the impact generated during the rotation of the piston in the hydraulic cylinder, comprising: a recess provided at the end of the piston rod and adapted to partially receive the cushion plunger; a first pin hole provided at the piston rod, the first pin hole extending in a direction orthogonal to the recess such that it communicates with the recess; a second pin hole perforated throughout the cushion plunger radially of the cushion plunger, the second pin hole being aligned with the first pin hole at a state that the cushion plunger is received in position in the recess; a fixing pin inserted into the first and second pin holes being aligned with each other, the fixing pin being adapted to fix the cushion plunger to the piston rod; and a clearance defined between the outer diameter of the fixing pin and the inner diameter of the second pin hole of the cushion plunger.

The mounting device in accordance with either aspect of the present invention has a simple construction, thereby achieving a reduced number of constituting elements and a great reduction in the number of manufacturing and assembling steps. By virtue of the clearance defined between the fixing pin and the pin hole of the cushion plunger, the impact generated upon the striking of the cushion plunger is applied to the inner wall of the piston rod and the end of the cushion plunger. Accordingly, the mounting device achieves a great improvement in durability.

DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1A:
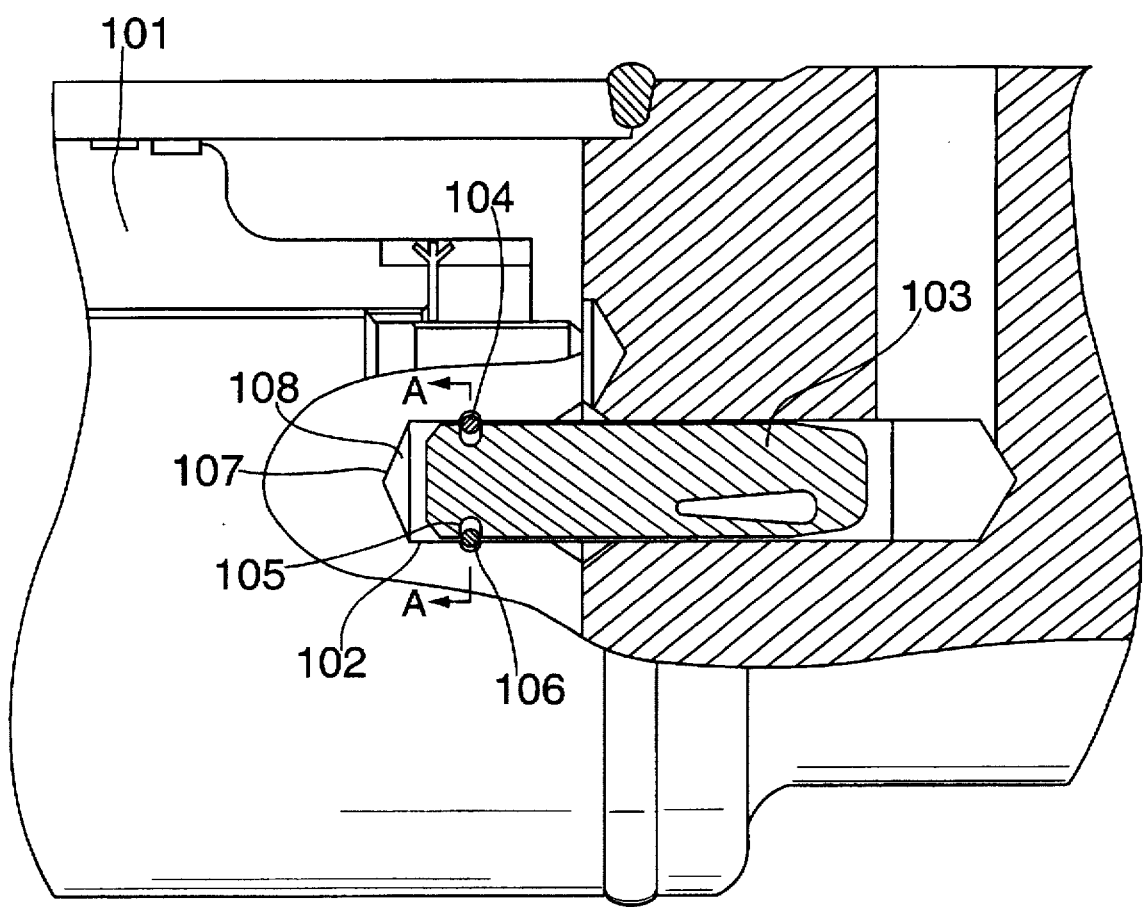
FIG. 1(A) and FIG. 1(B) are sectional views illustrating a conventional mounting device for a cushion plunger.
Figure 1B:
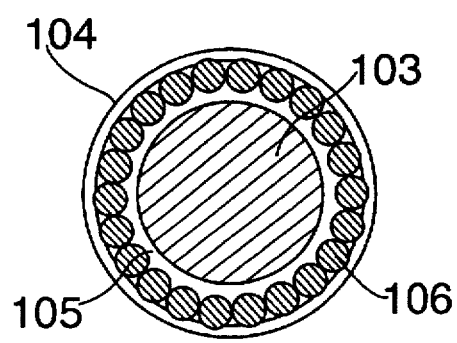
Figure 2:
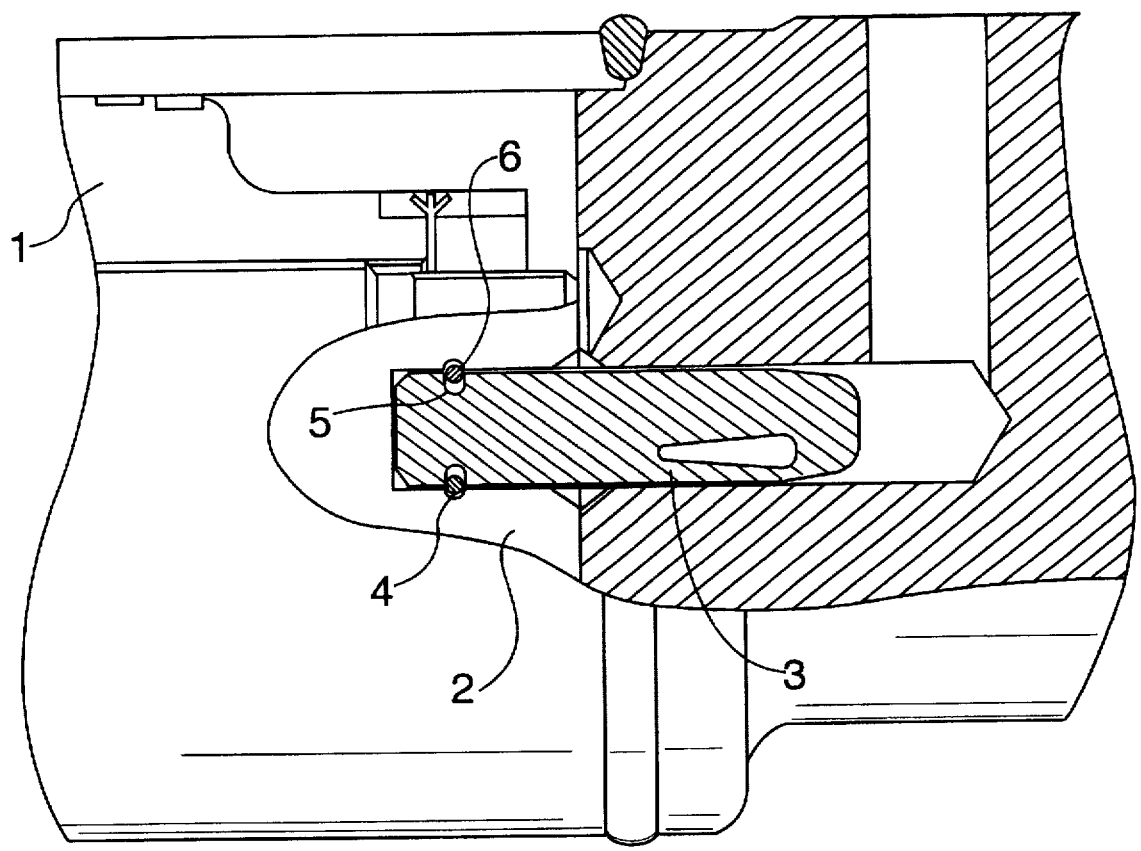
FIG. 2 is a sectional view illustrating a mounting device for a cushion plunger in accordance with an embodiment of the present invention.

Referring to FIG. 2, there is illustrated a mounting device in accordance with an embodiment of the present invention.

As shown in FIG. 2, a piston rod 1 is provided at its end with a recess 2 for receiving a cushion plunger 3 therein. Annular grooves 4 and 5 are formed along the inner peripheral surface of the recess 2 and the outer peripheral surface of the cushion plunger 3, respectively. An annular fixing ring 6 is received in an annular space defined by both the annular grooves 4 and 5, thereby firmly fixing the cushion plunger 3 to the piston rod 1.

Figure 3:
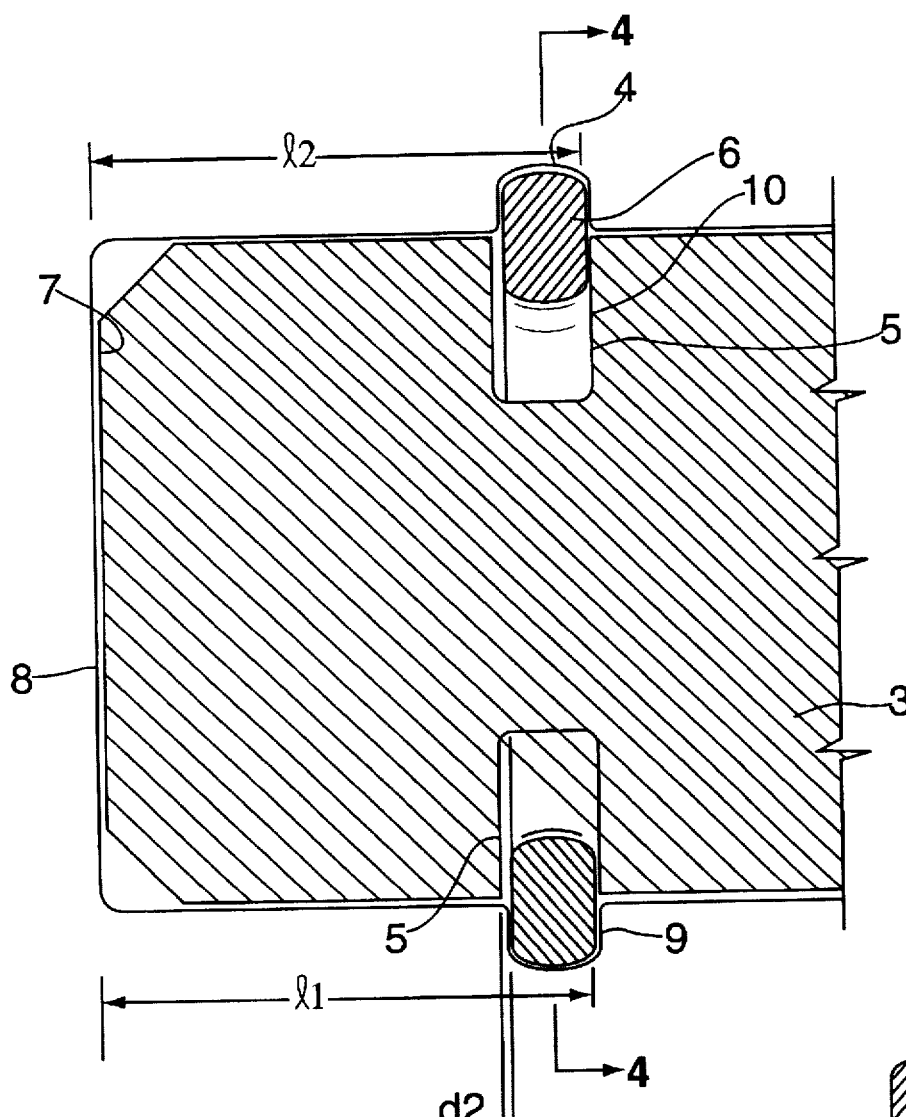
FIG. 3 is a detailed sectional view illustrating a part of the mounting device shown in FIG. 2.
Figure 4:
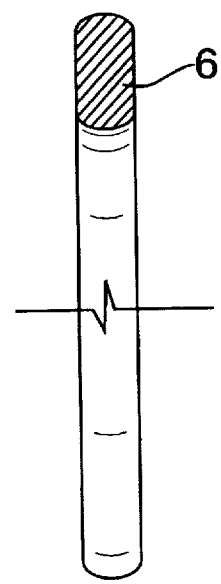
FIG. 4 is a cross-sectional view taken along the line 4—4 of FIG. 3.

As shown in FIGS. 3 and 4, it is preferred that the fixing ring 6 has a cross-section having an elongated shape having rounded radially inner and outer sides. In similar, the annular grooves 4 and 5 respectively receiving the radially outer and radially inner portions of the fixing ring 6 also have a cross-section having an elongated shape having rounded radially inner and outer sides.

It is also preferred that the groove 5 formed along the outer peripheral surface of cushion plunger 3 to receive and hold the radially inner portion of fixing ring therein has a width to provide a predetermined longitudinal clearance d2 between the groove 5 and the fixing ring 6. Meanwhile, the end 7 of the cushion plunger 3 is in surface contact with the inner end 8 of the recess 2. In other words, the distance 11 between the inner end 8 of the recess 2 and the right end 9 of the groove 4 is identical to the distance 12 between the end 7 of the cushion plunger 3 and the right end 10 of the groove 5.

In the construction shown in FIG. 2, a stability of the fixing ring 6 against the separation is ensured by virtue of the fact that the fixing ring 6 and grooves 4 and 5 have the elongated shape having rounded radially inner and radially outer sides capable of providing a large contact area. Even though the impact is applied to the cushion plunger 3, it is absorbed by the end of cushion plunger 3 and the inner end of recess 2 in contact with each other before it is transmitted to the fixing ring 6. Accordingly, the fixing ring 6 is prevented from being damaged or separated because it is not subjected to any overload. In assembling, the fixing ring 6 can be simply received in the groove 4 of the recess 2 without checking its insertion length. Accordingly, the convenience of the assembling work is greatly enhanced.

Figure 5:
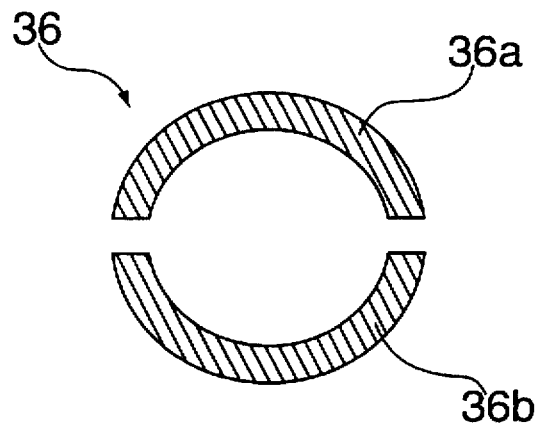
FIG. 5 is a view illustrating a construction of a fixing ring shown in FIG. 2 as being constituted by two ring halves divided from the ring along the center line of the ring.

In order to further improve the convenience of the assembling work, the fixing ring 36 may be constituted by two ring halves 36a and 36b divided from a complete ring along the center line of the ring, as shown in FIG. 5.

In this case, the replacement of the cushion plunger can be easily achieved because the ring halves 36a and 36b can be easily separated from grooves 4 and 5.

Figure 6:
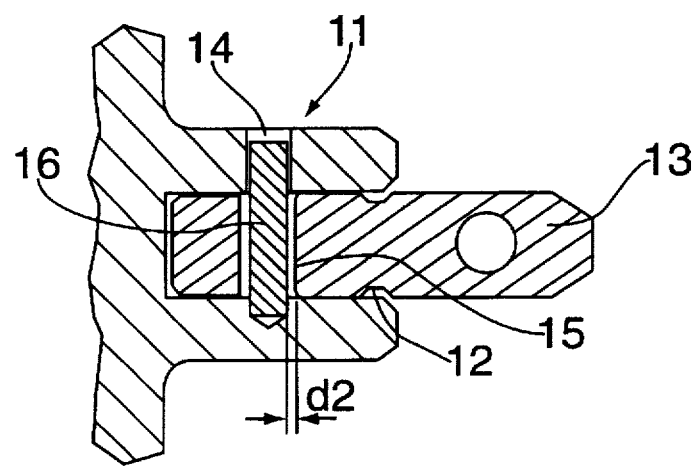
FIG. 6 is a sectional view illustrating a mounting device for a cushion plunger in accordance with another embodiment of the present invention.

FIG. 6 is a sectional view illustrating a mounting device for a cushion plunger in a hydraulic cylinder in accordance with another embodiment of the present invention.

Referring to FIG. 6, a piston rod 11 is shown as having an elongated recess 12. The recess 12 is longitudinally formed at an inner end of the piston rod 11. In the recess 12, a cushion plunger 13 is partially received. The piston rod 11 also has a pin hole 14 extending in a direction orthogonal to the recess 12 such that it communicates with the recess 12. At a position corresponding to the pin hole 14, the cushion plunger 13 is also provided with a pin hole 15 extending radially of the cushion plunger 13. The cushion plunger 13 is fixedly mounted in the recess 12 by a fixing pin 16 received in the pin holes 14 and 15. The pin hole 15 formed radially of the cushion plunger 13 has a predetermined diameter to provide a clearance d2 between the pin hole 15 and the fixing pin 16.

Upon mounting the cushion plunger 13 to the piston rod 11, the cushion plunger 13 is first inserted into the recess 12 of piston rod 11 such that the pin holes 14 and 15 are aligned with each other. Thereafter, the fixing pin 16 is inserted into the aligned pin holes 14 and 15. As the fixing pin 16 is received in the pin holes 14 and 15, the cushion plunger 13 is held in position without being separated from the piston rod 11. Due to the clearance defined between the fixing pin and the pin hole 15, the cushion plunger 12 is held in the recess 12 in a slightly loose state.

When the cushion plunger 13 strikes against the inner wall of the cylinder, it is retracted a small distance within the clearance d2 in the left direction of FIG. 6. By virtue of this movement of the cushion plunger 13, the impact generated due to the striking of the cushion plunger 13 is not applied to the inner wall of the piston rod 11 and the fixing pin 16 via the left end of the cushion plunger 13 at all and only a very small part thereof is applied if any at all. Accordingly, it is possible to greatly improve the durability of the cushion mechanism.

As apparent from the above description, the mounting device for the cushion plunger in accordance with the present invention includes no weak part that is easily damaged upon the striking of the cushion plunger, thereby enabling the durability of the cushion mechanism to be greatly improved. The mounting device of the present invention also achieves a great reduction in the number of constituting elements thereof. Furthermore, the mounting device has a very simple construction. As a result, it is possible to greatly reduce the number of manufacturing and assembling steps.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A device for mounting a cushion plunger to one end of a piston rod in a hydraulic cylinder in combination with the cushion plunger and the piston rod, the cushion plunger constituting a part of a cushion mechanism installed to dampen the impact generated during rotation of the piston in the hydraulic cylinder, comprising:

a recess provided at an end of the piston rod;

a pair of annular grooves respectively formed along an inner peripheral surface of the recess and an outer peripheral surface of the cushion plunger; and a fixing ring received in the grooves, wherein the fixing ring has a cross-section that is elongated in a radial direction and includes flat axial sides and a rounded radially inner side and a rounded radially outer side, the grooves have cross-sections respectively corresponding to those of radially outer and radially inner portions of the fixing ring, the groove formed along the outer peripheral surface of the cushion plunger to support the radially inner portion of the fixing ring having an axial width sufficient to provide a predetermined clearance in an axial direction between the groove and the fixing ring, and the recess has an inner end being in contact with an end of the cushion plunger facing the inner end, wherein the fixing ring comprises two ring halves divided from a complete ring along a centerline of the ring.

2. A device for mounting a cushion plunger to one end of the piston rod in a hydraulic cylinder in combination with the cushion plunger and the piston rod, the cushion plunger constituting a part of a cushion mechanism installed to dampon the impact generated during the rotation of the piston in the hydraulic cylinder, comprising:

a recess provided at the end of the piston rod and adapted to partially receive the cushion plunger;

a first pin hole provided at the piston rod, the first pin hole extending in a direction orthogonal to the recess such that it communicates with the recess;

a second pin hole perforated throughout the cushion plunger radially of the cushion plunger, the second pin hole being aligned with the first pin hole at a state that the cushion plunger is received in position in the recess;

a fixing pin inserted into the first and second pin holes being aligned with each other, the fixing pin being adapted to fix the cushion plunger to the piston rod; and a clearance defined between the outer diameter of the fixing pin and the inner diameter of the second pin hole of the cushion plunger.

* * * * *